(12) United States Patent
Iwano et al.

(10) Patent No.: US 6,293,873 B1
(45) Date of Patent: Sep. 25, 2001

(54) UNIVERSAL JOINT

(75) Inventors: Kazuhiro Iwano; Yoshio Hiraga; Kazunobu Haneishi, all of Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/559,997

(22) Filed: Apr. 27, 2000

(30) Foreign Application Priority Data

Apr. 27, 1999 (JP) .................................................. 11-120481

(51) Int. Cl.$^7$ ........................................................ F16D 3/84
(52) U.S. Cl. .......................... 464/173; 464/175; 277/636
(58) Field of Search ................................... 464/171, 173, 464/175, 106, 111, 112, 139; 277/636

(56) References Cited

U.S. PATENT DOCUMENTS

| | | | |
|---|---|---|---|
| 3,204,427 | * 9/1965 | Dunn | 464/175 |
| 3,362,193 | * 1/1968 | Ritsema | 464/175 |
| 3,468,171 | * 9/1969 | Macielinski | 464/139 |
| 3,583,244 | * 6/1971 | Teinert | 464/173 |
| 4,556,400 | * 12/1985 | Krude et al. | 464/181 |
| 4,557,491 | * 12/1985 | Orain | 464/111 |
| 4,747,805 | * 5/1988 | Welschof et al. | 464/175 |
| 4,767,381 | * 8/1988 | Brown et al. | 464/173 |
| 5,176,576 | * 1/1993 | Moulindt | 464/111 |
| 5,183,351 | * 2/1993 | Schneider | 464/171 |
| 5,230,660 | * 7/1993 | Warnke | 464/139 |
| 5,297,996 | * 3/1994 | Dragna | 464/175 |
| 5,451,186 | * 9/1995 | Poulin et al. | 464/175 |
| 6,093,108 | * 7/2000 | Moulinet | 464/173 |
| 6,179,717 | * 1/2001 | Schwarzler | 464/175 |

FOREIGN PATENT DOCUMENTS

| | | | |
|---|---|---|---|
| HEI742987 | 5/1995 | (JP) | F16D/3/24 |
| HEI828704 | 2/1996 | (JP) | F16D/3/04 |
| HEI914284 | 1/1997 | (JP) | F16D/3/84 |

\* cited by examiner

*Primary Examiner*—Lynne H. Browne
*Assistant Examiner*—Kenn Thompson
(74) *Attorney, Agent, or Firm*—Orum & Roth

(57) ABSTRACT

A universal joint (1) is provided with a boot (10) which has one end fitted to the inner element (2) and the other end fitted to the outer element (3) so as to seal between the inner element (2) and the outer element (3). The boot (10) is constituted by a flexible boot main body (11) and an adapter (12). During fitting between the outer element (3) and the adapter (12), an inside of the boot (10) and the open air are communicated with each other via a communication passage formed by a communication groove (12f) of the adapter (12), and pressure of air within the boot (10) is kept at the same pressure as that of the open air.

3 Claims, 9 Drawing Sheets

UNIVERSAL JOINT

BACKGROUND OF THE INVENTION

1. Field of the Invention

The present invention relates to a universal joint, for example, which is used in a propeller shaft and a drive shaft of a vehicle, and which is provided with a boot disposed between an inner and an outer element of the universal joint, sealing and holding lubricant such grease or the like therewithin and preventing dust, water or the like from entering from the outside.

2. Description of the Related Art

Regarding a conventional universal joint provided with a boot, there is, for example, a structure described in Japanese Patent Application Laid-Open (JP-A) No. 9-14284. The universal joint 'a' described in this publication is a tripod type uniform joint which is used in a drive shaft of a vehicle, and is provided with a cylindrical outer 'b' and an inner 'c' fitted into the outer 'b', as shown in FIG. 12.

The inner 'c' is provided with a drive shaft 'd', a ring-like member which is mounted to an end portion of the drive shaft 'd' and three rollers 'e' which are rotatably supported to three support shafts extending from the ring-like member outward in a diametrical direction and arranged in a peripheral direction at a uniform interval, respectively. Further, three guide grooves which are formed for respectively receiving three rollers 'e' of the inner 'c' along an axial direction are provided in an inner periphery of the outer 'b'. Then, a torque is transmitted between the inner 'c' and the outer 'b' via three rollers 'e' which are engaged with the guide grooves.

On the contrary, a boot 'f' mounted between the inner 'c' and the outer 'b' of the universal joint 'a' is constituted by a cylindrical boot metal fitting 'g' and a flexible elastic body 'h' fixed to one end portion of the boot metal fitting 'g'. The boot metal fitting 'g' is fitted to an outer periphery of the outer 'b' and the elastic body 'h' is fitted to an outer periphery of the drive shaft 'd'. An O-ring 'i' is attached to a groove formed in the fitting portion of the outer 'b'. In the manner mentioned above, the inside of the joint is kept airtight by the boot 'f' to prevent the lubricant charged therewithin from leaking out and dust, water or the like from entering thereinto.

In this case, in the prior art mentioned above, when inserting the inner 'c' to which the boot 'f' is fitted into the inside of the outer 'b' so as to assemble the inner 'c' and the outer 'b', the boot metal fitting 'g' is fitted to the outer periphery of the outer 'b'. At this time, since the air within the boot 'f' is not taken out while the inner periphery of the boot metal fitting 'g' is brought into contact with the O-ring 'i', the portion between the boot metal fitting 'g' and the outer 'b' is sealed by the O-ring 'i', and when the boot metal fitting 'g' is further inserted to reach the final fitting position, the air is compressed and the pressure thereof is increased. As a result, the elastic body 'h' is expanded in a manner shown by a double dot chain line in FIG. 12 due to the increased air pressure.

In the case that the elastic body 'h' is used in this state, the elastic body 'h' and the drive shaft 'd' may rub against each other when the inner 'c' and the outer 'b' relatively move in an axial direction, and an angle formed by an axis of the outer 'b' and an axis of the inner 'c' changes, so that durability of the boot 'f' is deteriorated. Further, since the elastic body 'h' is expanded when the sealed air is expanded due to a centrifugal force of the grease during rotation of the universal joint 'a' and a temperature increase, the elastic body 'h' and the inner 'c' rub against each other under a stronger force.

Then, in order to avoid the matter mentioned above, an air pressure adjusting operation may be performed for taking out the air sealed and pressurized within the boot 'f' after the fitting operation between the boot metal fitting 'g' and the outer 'b' is completed, and the assembly between the inner 'c' and the outer 'b' is completed. This air pressure adjusting operation is performed, for example, by inserting a tool into the fitting portion between the elastic body 'h' and the drive shaft 'd', thereby forming an interval for communicating the inside of the boot 'f' with the open air between the both so as to discharge the air within the boot to the open air.

However, since the adjusting operation not only increases the process and labor of assembling the universal joint but also damages the boot 'f' during the adjusting operation, the adjusting operation must be performed very carefully. Because of the care required, there is generated a reduction of efficiency of the operation of assembling the universal joint 'a'.

SUMMARY OF THE INVENTION

The present invention is made by taking the matter mentioned above into consideration, and setting as one object of the present invention to improve efficiency of an operation of assembling a universal joint by adjusting a pressure of air within a boot during the universal joint assembly.

In accordance with the present application, there is provided a universal joint comprising: an inner and an outer element which are assembled with each other; and a boot which has one end fitted to the inner and the other end fitted to the outer so as to seal between the inner and the outer, wherein a communication passage which causes insides of the boot and the open air to communicate with each other until the outer is positioned at a location near a fitting operation completing position from a fitting operation starting position. This shuts communication with the insides of the boot and the open air when the outer is positioned at the fitting operation completing position, in a fitting portion between the outer and the boot.

In this case, in this specification, the position near the fitting operation completing position of the outer means a position at which the communication passage is closed, and the boot is not expanded or is only slightly expanded in accordance with the pressure increase of the air within the boot caused by the relative movement. This is so even when the outer moves to the fitting operation completing position with respect to the boot. Also, there is not generated a disadvantage that the boot and the inner rub against each other as mentioned in the prior art, and only a slight expansion is generated. Further, in this specification, circles such as a cylinder, a ring, a circumference, a circular arc and the like include not only a severe circular shape but also a substantially circular shape corresponding to a shape approximating a circle.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

A description will be given below of embodiments in accordance with the present invention with reference to FIGS. 1 to 11.

Figure 1:
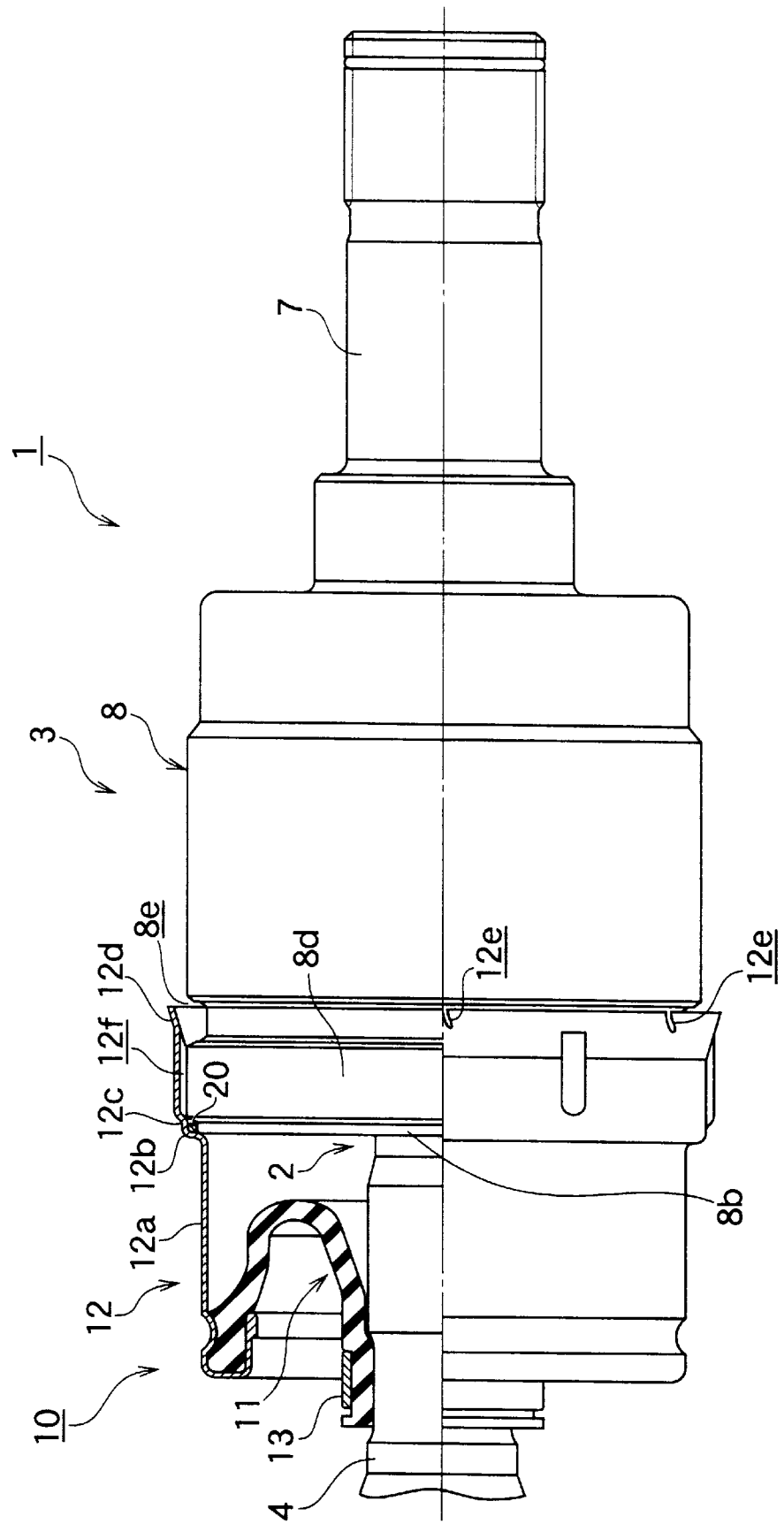
FIG. 1 is a side elevational view showing a universal joint in accordance with a first embodiment of the present invention and a part of the universal joint in a fitting operation completing state in a cross sectional manner.
Figure 2:
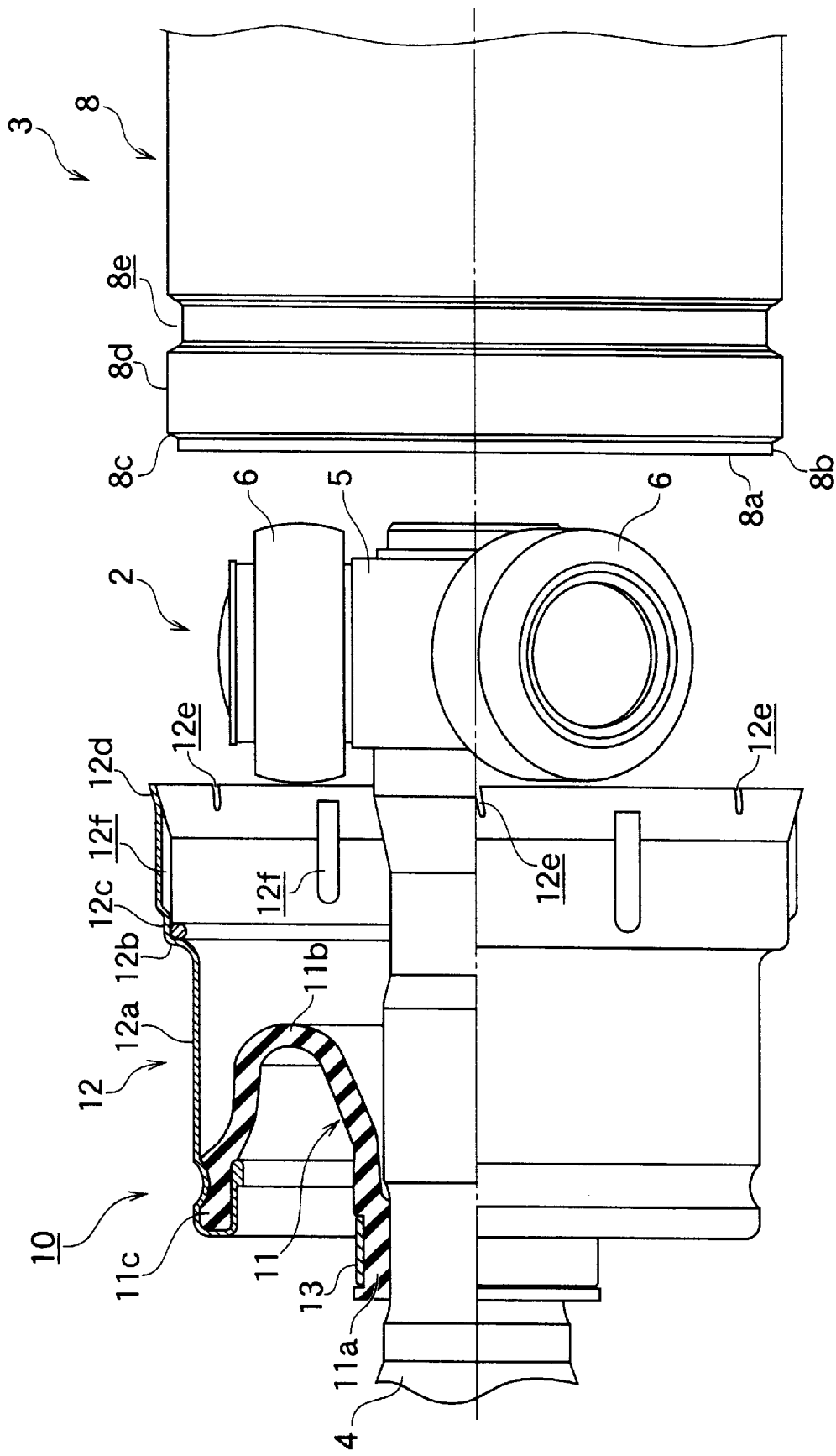
FIG. 2 is a side elevational view showing a part of the universal joint in a state prior to an assembly in a cross sectional manner.
Figure 3:
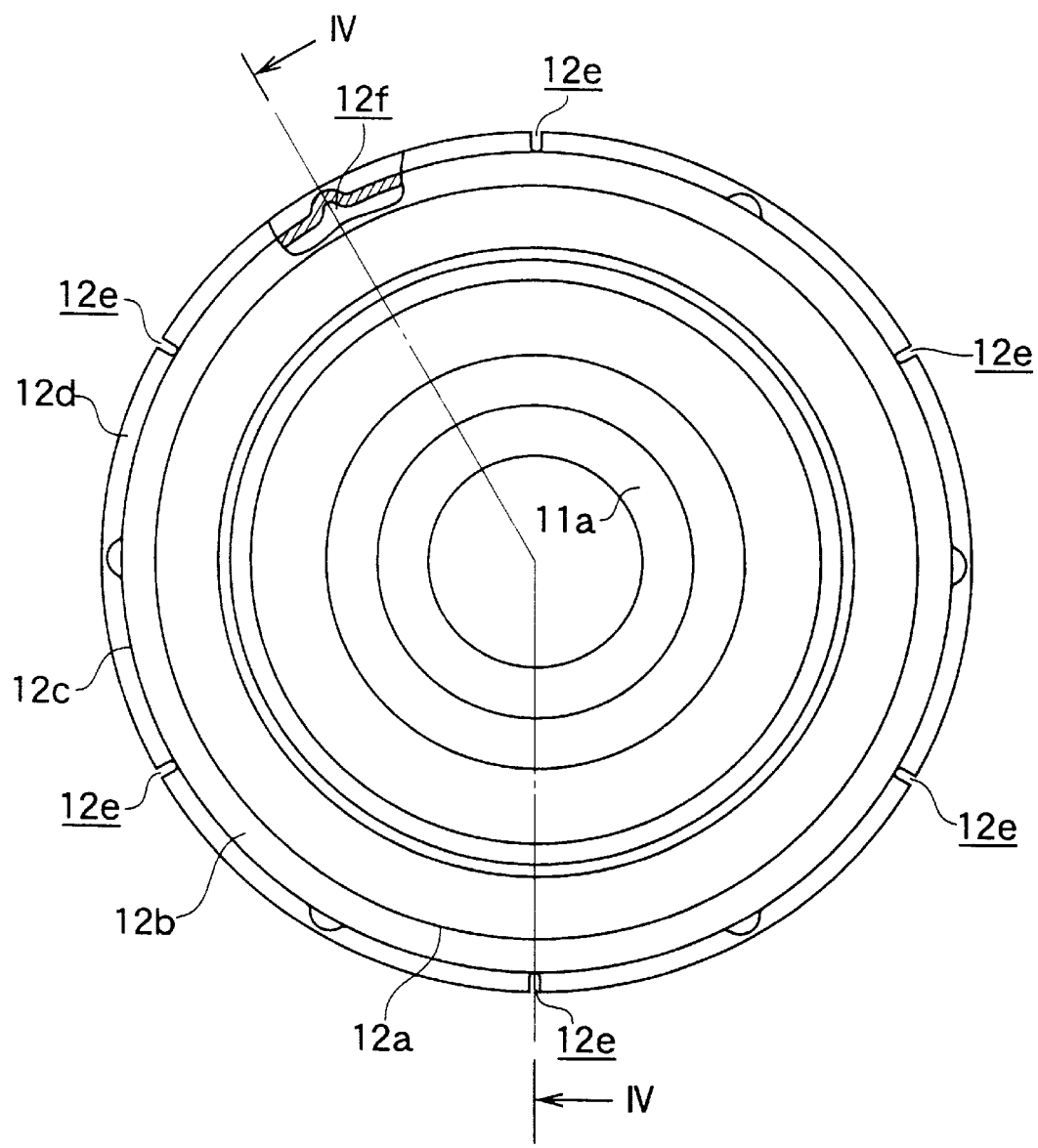
FIG. 3 is a front elevational view of a boot.
Figure 4:
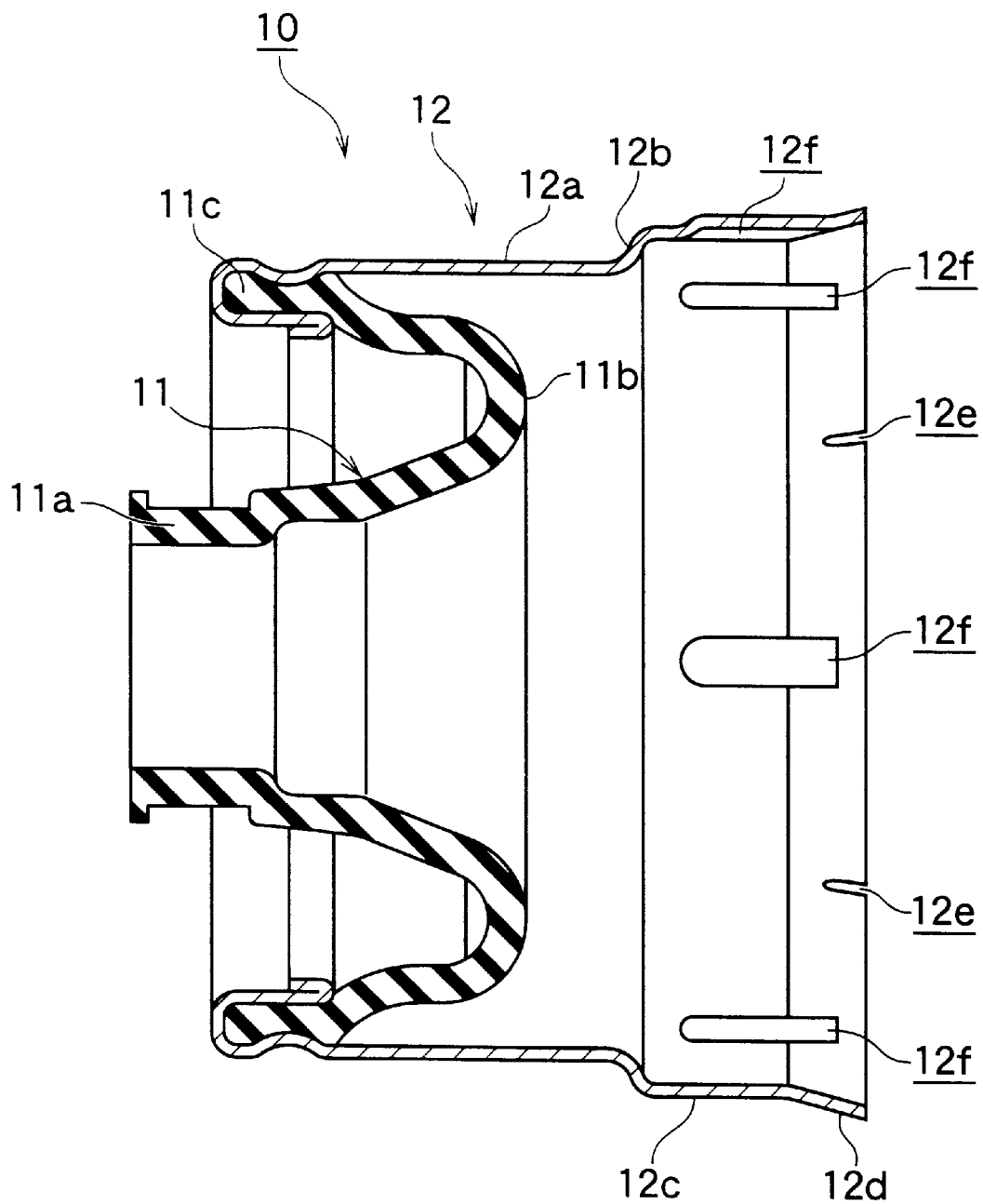
FIG. 4 is a cross sectional view taken along a line IV—IV in FIG. 3.
Figure 5:
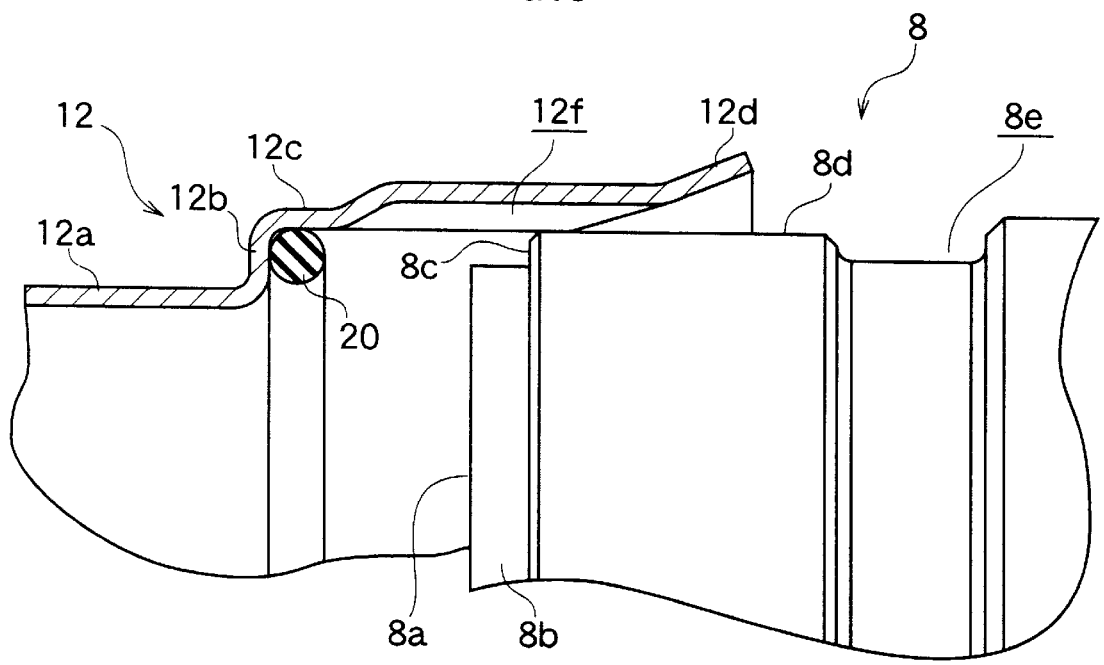
FIG. 5 is an enlarged view showing a main portion of the universal joint shown in FIG. 1 during a fitting operation.
Figure 6:
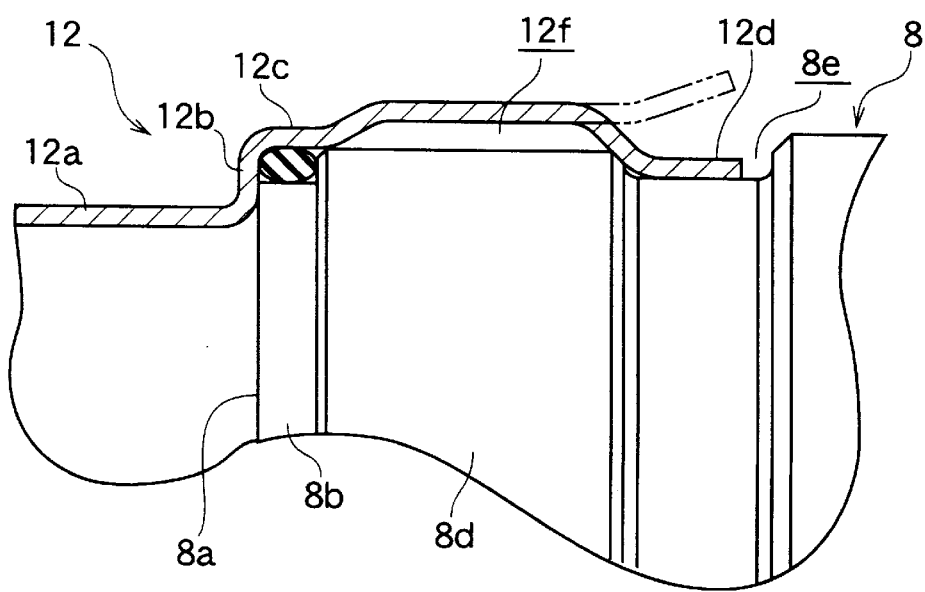
FIG. 6 is an enlarged view showing a main portion of the universal joint shown in FIG. 1 in a state of completed assembly.

FIG. 1 is a side elevational view showing a universal joint in accordance with a first embodiment of the present invention and a part of the universal joint in a fitting operation completed state in a cross sectional manner, FIG. 2 is a side elevational view showing a part of the universal joint in a state prior to an assembly in a cross sectional manner, FIG. 3 is a front elevational view of a boot, FIG. 4 is a cross sectional view taken along a line IV—IV in FIG. 3, FIG. 5 is an enlarged view showing a main portion of the universal joint shown in FIG. 1 during a fitting operation, and FIG. 6 is an enlarged view showing a main portion of the universal joint shown in FIG. 1 in a completed assembly.

The universal joint 1 is a tripod type uniform joint which is used in a propeller shaft of a vehicle. As shown in FIGS. 1 and 2, an inner 2 has a shaft portion 4 corresponding to a drive shaft, a ring-like spider 5 which is spline fitted to a shaft end portion of the shaft portion 4 and integrally rotates with the shaft portion 4, and three rollers 6 which are rotatably supported to three support shafts arranged in a peripheral direction of the spider 5 at a uniform interval and extending outward in the diametrical direction, respectively, via a holder.

An outer 3 corresponding to a joint has a shaft portion 7 and a cylindrical portion 8. The roller 6 supported to the spider 5 of the inner 2 is received in an inside of the cylindrical portion 8. Accordingly, three guide grooves disposed along an axial direction are formed in the inner periphery of the cylindrical portion 8 at a uniform interval in a peripheral direction, and three rollers 6 are respectively engaged in a direction of rotation within the guide grooves and freely move in an axial direction. Further, a torque is transmitted between the outer 3 and the inner 2 via the roller 6 engaged with the guide groove.

An opening end surface 8a, a small diameter circumferential surface 8b, a step end surface 8c formed between the small diameter circumferential surface 8b and a fitting circumferential surface 8d mentioned below, the fitting circumferential surface 8d and an annular groove 8e are formed on an outer periphery of the outer 3, in this order. The small diameter circumferential surface 8b has an outer diameter smaller than that of the fitting circumferential surface 8d and has a seal surface which is brought into contact with an O-ring 20 mentioned below in an airtight manner. Further, the fitting circumferential surface 8d is fitted to an inner periphery of a large cylinder portion 12c of an adapter 12 mentioned below in a press fit state is centered between the outer 3 and the adapter 12, and is structured such that no play is generated between them.

As illustrated in FIGS. 3 and 4, a boot 10 is provided for sealing between the inner 2 and the outer 3, preventing lubricant such as grease charged within the outer 3 and within the boot 10 from leaking, and preventing dust, water and the like from entering into the boot 10. The boot 10 is constituted by a boot main body 11 and an adapter 12.

The flexible boot main body 11 formed by elastic material such as a rubber or the like has a small cylinder end portion 11a, a large cylinder end portion 11c positioned outward in a diametrical direction of the small cylinder end portion 11a, and a curve portion 11b formed by being folded between both of the cylinder end portions 11a and 11c. The small cylinder end portion 11a is structured such that the shaft portion 4 of the inner 2 is fitted to the inside thereof and the small cylinder end portion is fastened and fixed by a band 13, whereby the boot main body 11 and the shaft portion 4 are sealed. Further, the large cylinder end portion 11c of the boot main body 11 is gripped by a folded end portion of a small cylinder portion 12a mentioned below of the adapter 12 from an outer peripheral side and an inner peripheral side thereof, and is fixed to the adapter 12.

The cylindrical adapter 12 with a step formed by a metal material such as a stainless steel plate or the like has the small cylinder portion 12a having a predetermined inner diameter, a large cylinder portion 12c having an inner diameter larger than the inner diameter of the small cylinder portion 12a, an annular step portion 12b formed between both of the cylinder portions 12a and 12c, and a taper portion 12d extending from the large cylinder portion 12c to the opening end surface.

Since the inner diameter of the large cylinder portion 12c of the adapter 12 is set so as to have a suitable press inserting space with respect to the fitting circumferential surface 8d of the fitted outer 3, it is set so as to be smaller than the outer diameter of the fitting circumferential surface 8d at a degree corresponding to the press inserting space. Further, the inner periphery of the large cylinder portion 12c has a seal surface which is brought into contact with the O-ring 20 in an airtight manner.

The taper portion 12d of the adapter 12 is formed in a shape such that an inner diameter thereof gradually increases from the large cylinder portion 12c toward the opening end surface. Six slits 12e are formed in the taper portion 12d from the opening end surface at a substantially middle position between two communication grooves 12f mentioned below in a peripheral direction at a uniform interval, whereby it is easy to reduce the diameter of the taper portion 12d by caulking of the taper portion 12d with respect to the groove 8e.

Six communication grooves 12f are formed in the adapter 12 from the large cylinder portion 12c to the taper portion 12d in a peripheral direction at a uniform interval. The communication groove 12f is formed by swelling the adapter 12 to the outside in a diametrical direction so as to form a circular arc. The communication groove 12f extends from the taper portion 12d to a predetermined position in an axial direction of the large cylinder portion 12c along an axial direction, and a communication passage for communicating the inside of the boot with the open air is formed between the communication groove 12f and the fitting circumferential surface 8d of the outer 3. The predetermined position mentioned above corresponds to a position at which a communication between the inside of the boot 10 and the communication groove 12f is shut when the outer 3 is positioned at a position near the fitting operation completing position and the outer 3 is brought into contact with the O-ring 20. In this embodiment, it is positioned near the portion close to the opening end surface of the contact portion with the O-ring 20 on the inner periphery of the large cylinder portion 12c.

The O-ring 20 corresponding to the sealing apparatus is mounted to the inner surface of the step portion 12b of the adapter 12. The O-ring 20 is diametrically pressed between the small diameter circumferential surface 8b of the outer 3 and the inner peripheral surface of the large cylinder portion 12c of the adapter 12 such that the outer 3 reaches the fitting operation completing position, thereby sealing between the outer 3 and the adapter 12.

As mentioned above, leakage of the lubricant such as grease charged within the outer 3 and within the boot 10, and the entering of dust, water and the like into the boot 10 and into the outer 3 are prevented by sealing between the inner 2 and the boot main body 11, and sealing between the outer 3 and the adapter 12.

A description will be given of a step of assembling the inner 2 and the outer 3 with reference to FIGS. 2, 5 and 6.

The boot 10 in which the O-ring 20 is previously mounted to the inner surface of the step portion 12b of the adapter 12 by utilizing its elasticity is inserted into the shaft portion 4, and the small cylinder end portion 11a of the boot main body 11 is fastened by the band 13, thereby being fixed to the shaft portion 4. Next, the spider 5 is mounted to the shaft portion 4, the lubricant such as the grease or the like is charged into the boot 10 and into the outer 3, and the roller 6 is mounted to the spider 5 via the holder.

Then, the inner 2 and the outer 3 thus prepared are coaxially set in a horizontal direction, as shown in FIG. 2, and to align positions in a peripheral direction so that three rollers 6 of the inner 2 respectively oppose three guide grooves of the outer 3.

Next, the inner 2 is inserted into the outer 3 and the fitting operation between the adapter 12 and the outer 3 is started together with the press inserting. A middle stage of the fitting operation is shown in FIG. 5. In this state, since the inside of the boot 10 is communicated with the open air via the communication groove 12f, the air within the boot flows out to the outside through the communication groove 12f as the fitting operation is further performed. Accordingly, since the pressure of the air within the boot 10 is kept at the same pressure as that of the open air, the boot main body 11 is not expanded due to the pressure of the air within the boot 10. The state whereby the inside of the boot 10 is communicated with the open air is maintained until the outer 3 is positioned at the position near the fitting operation completing position. When the outer 3 is positioned at the position near the fitting operation completing position, the communication between the inside of the boot 10 and the communication groove 12f is shut due to the contact between the outer 3 and the O-ring 20, and the inside of the boot 10 is shut from the open air.

At the time when the outer 3 reaches the fitting operation completing position and the fitting operation is completed, the inner periphery of the large cylinder portion 12c and the small diameter circumferential surface 8b are brought into contact with each other as shown in FIG. 6, so that the O-ring 20 is pressed down and the sealing between the outer 3 and the adapter 12 is performed. A suitable compression force to the O-ring 20 generated by the adapter 12 and the outer 3 is set by suitably setting an axial direction interval formed between the inner surface of the step portion 12b of the adapter 12 and the step portion end surface 8c of the outer 3 due to contact between the step portion 12b of the adapter 12 and the outer 3. In this way, excessive compression of the O-ring 20 is prevented.

Then, the taper portion 12d of the adapter 12 in a state shown by a double dot chain line in FIG. 6 is caulked to the groove 8e as shown by a solid line in FIG. 6 at the time when the fitting operation between the outer 3 and the adapter 12 is completed, thereby preventing the boot 10 from being taken out from the outer 3, thereby completing assembly of the universal joint 1.

Since the first embodiment is constructed in the manner mentioned above, the following effects can be obtained.

Since the air within the boot 10 flows out to the open air through the communication passage formed by the communication groove 12f of the adapter 12 during the fitting operation between the outer 3 and the adapter 12 until the outer 3 and the adapter 12 of the boot 10 reaches the position near the fitting operation completing position from the fitting operation starting position corresponding to the position at which the outer 3 and the adapter 12 of the boot 10 start fitting, at the time of assembling the inner 2 and the outer 3 of the universal joint 1, the pressure of the air within the boot 10 is kept at the same pressure as that of the open air. The pressure of the air within the boot 10 is adjusted at the same time when the inner 2 and the outer 3 are assembled, so that it is unnecessary to adjust the pressure of the air within the boot 10 after the fitting operation between the outer 3 and the adapter 12 is completed, which incidentally is performed in the prior art, so that it is possible to improve an efficiency of an assembling operation of the universal joint 1. Further, since it is unnecessary to adjust the air pressure using a tool, no damage is done to the boot 10. The communication groove 12f can be easily formed only by applying a process for forming the groove on the existing adapter 12.

It is possible to simply and securely shut the communication between the communication groove 12f and the inside of the boot 10 by the O-ring 20 which is attached to the inner surface of the step portion 12b of the adapter 12. Further, since the O-ring 20 for sealing the outer 3 and the boot 10 is utilized in order to shut the communication between the communication groove 12f and the inside of the boot 10, it is not necessary to independently provide and form a member for closing the communication groove 12f.

Since the outer 3 is fitted to the inner periphery of the adapter 12 in a press insertion state, centering between the outer 3 and the adapter 12 can be easily performed, and no play is generated between them.

Next, a description will be given of a second embodiment of the present invention with reference to FIGS. 7 to 11. In this case, the same reference numerals are attached to the same or corresponding elements as those of the first embodiment mentioned above. A description thereof will be omitted and a description will be mainly given of a different portion.

Figure 7:
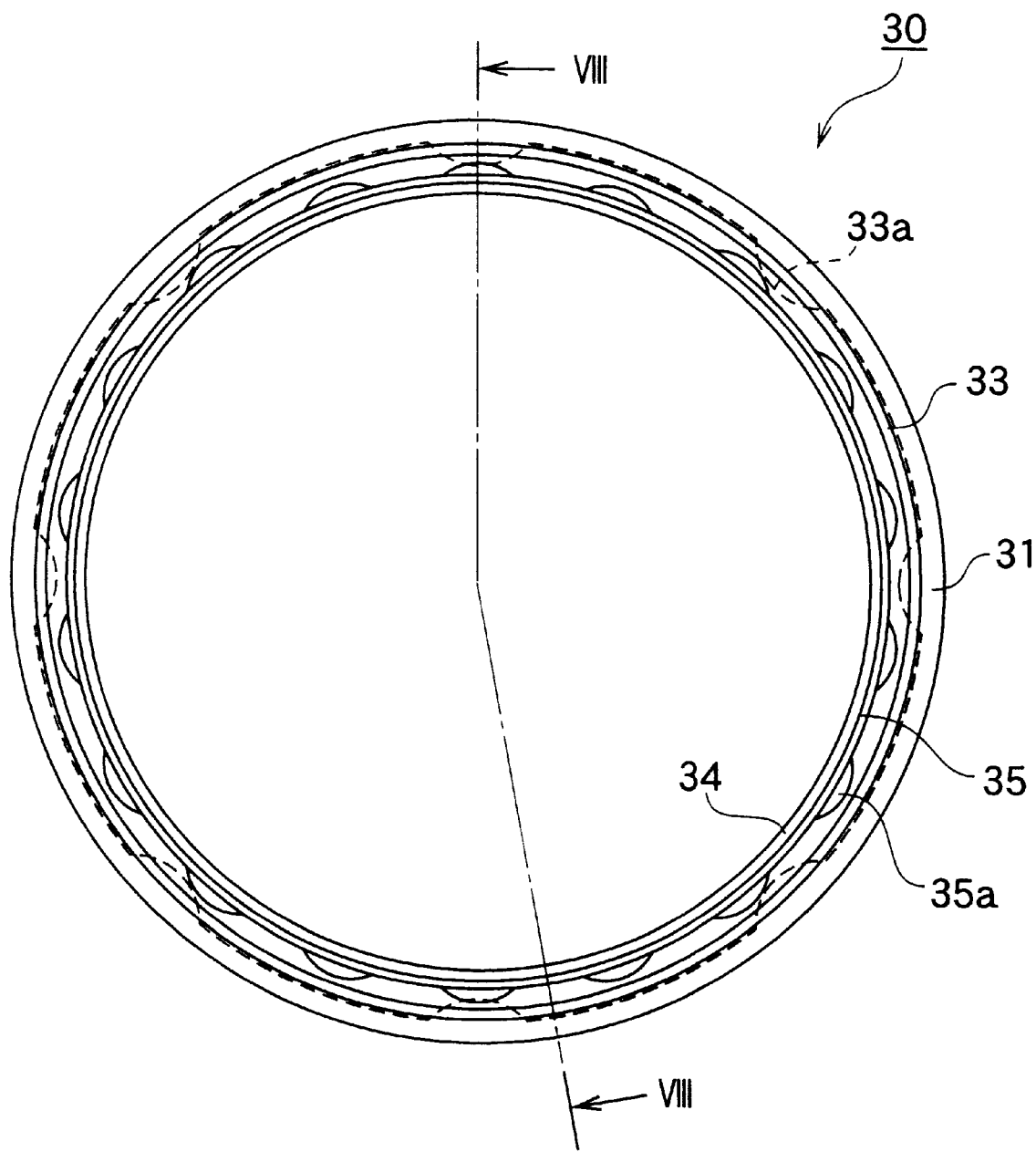
FIG. 7 is a front elevational view of a sealing apparatus employed for a universal joint in accordance with a second embodiment of the present invention.
Figure 8:
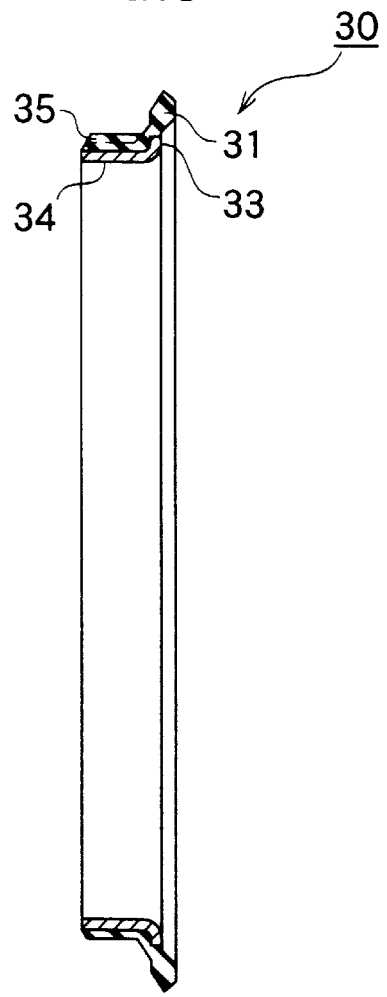
FIG. 8 is a cross sectional view taken along a line VIII—VIII in FIG. 7.
Figure 9:
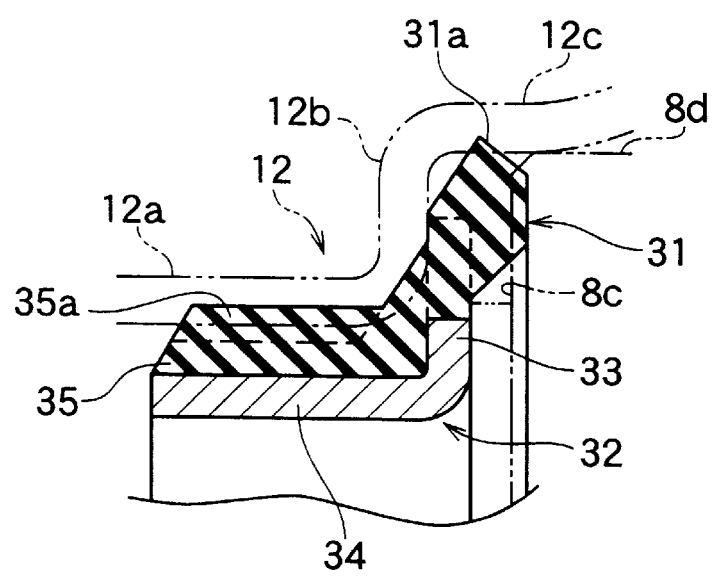
FIG. 9 is an enlarged view showing a main portion of the sealing apparatus of FIG. 7.
Figure 10:
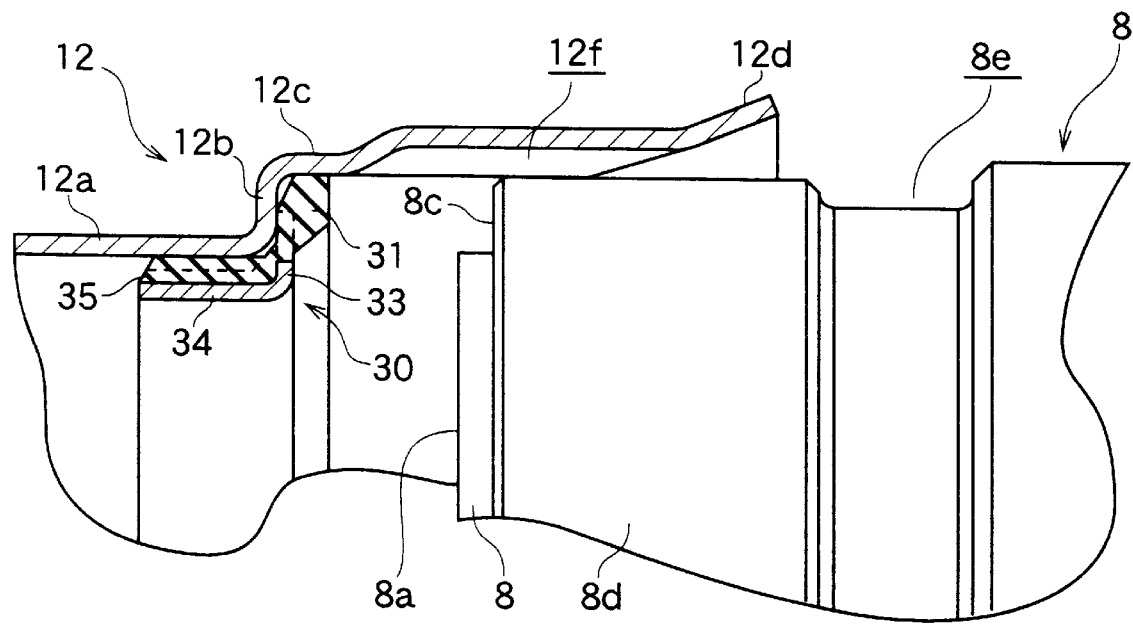
FIG. 10 is an enlarged view showing a main portion of the universal joint in accordance with the second embodiment of the present invention during a fitting operation.
Figure 11:
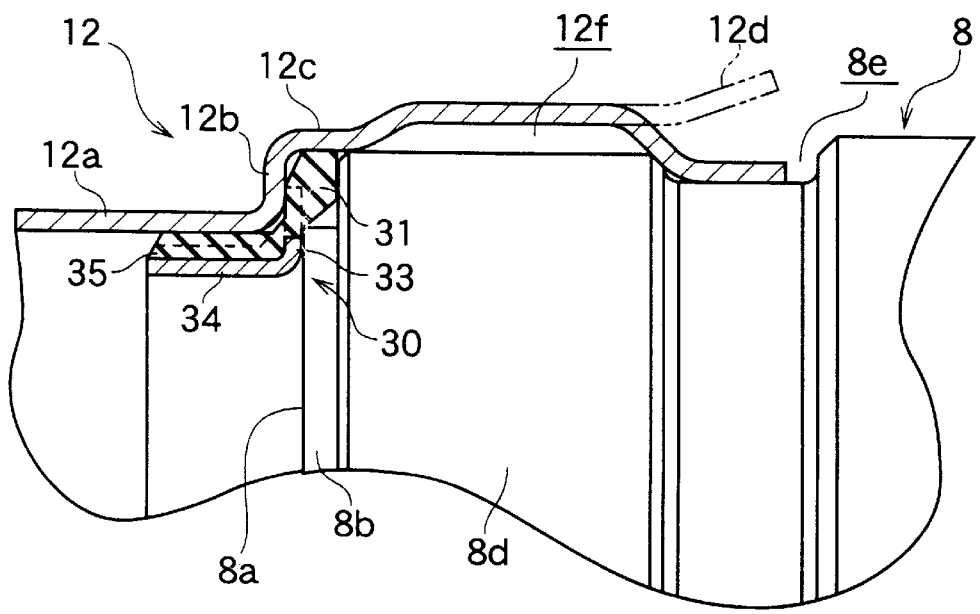
FIG. 11 is an enlarged view showing a main portion of the universal joint shown in FIG. 10 in a completed assembly.
Figure 12:
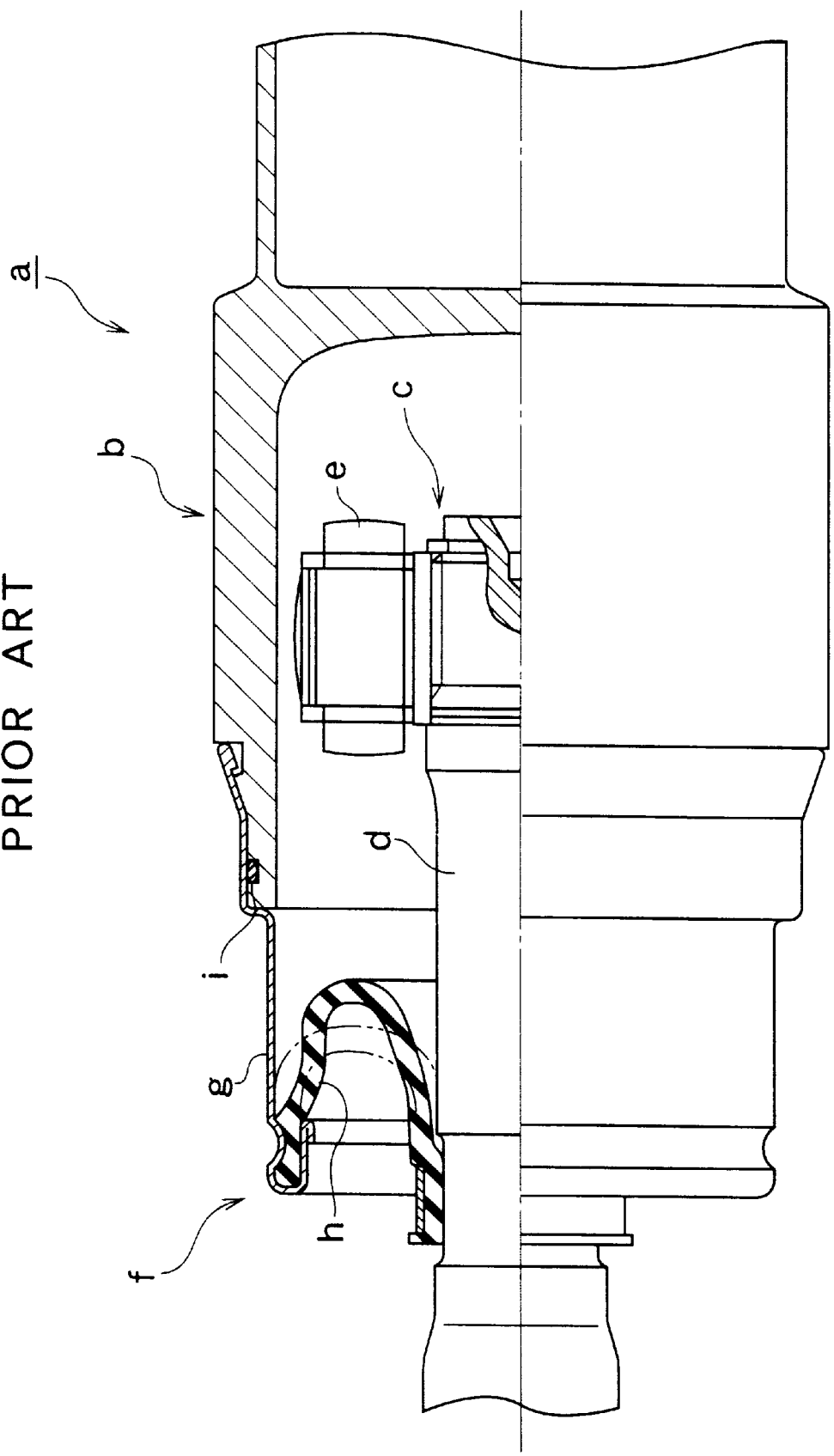
FIG. 12 is a view showing a prior art.

FIG. 7 is a front elevational view of a sealing apparatus, FIG. 8 is a cross sectional view taken along a line VIII—VIII in FIG. 7, FIG. 9 is an enlarged view showing a main portion of the sealing apparatus, FIG. 10 is an enlarged view showing a main portion of the universal joint during a fitting operation, and FIG. 11 is an enlarged view showing a main portion of the universal joint in a completed assembly.

In the second embodiment, the structure of the sealing apparatus is different from that of the first embodiment.

A description will be given of a sealing apparatus 30 with reference to FIGS. 7 to 9. The sealing apparatus 30 is structured such that a rubber member made of, for example, an acrylonitrile-butadiene rubber (NBR) corresponding to elastic material is fixed to a metal fitting 32, for example, integrally formed from a steel plate by baking or the like. Further, the metal fitting 32 having an L-shaped cross section is constituted by a cylinder portion 34 and an annular outer flange 33 perpendicularly crossing an axis of the cylinder portion 34.

The rubber member is integrally baked all over a portion close to an inside in a diametrical direction of a side surface of the flange 33 in a side of the cylinder portion 34 (hereinafter, referred to as a cylinder portion side flange side surface), all the surface of a peripheral edge surface of the flange 33, a portion close to an outside in a diametrical direction of a side surface of the flange 33 opposite to the side surface on which the cylinder portion 34 is provided (hereinafter, referred to as an opposite cylinder portion side flange side surface) and all the surface of the outer periphery of the cylinder portion 34. The rubber member baked on the cylinder portion side flange side surface is formed as a taper surface in which a thickness of the rubber member is reduced toward the outside in the diametrical direction.

A plurality of notch portions 33a each having an outer shape formed in a circular arc shape are formed in the flange 33 in a peripheral direction at a uniform interval. Since the rubber member baked in the L-shaped metal fitting 32 is integrally formed via the notch portion 33a, it is easy to bake the rubber material in the metal fitting 32.

Further, the surface in which the rubber member close to the outside, in the diametrical direction of the flange side surface in the side of the cylinder portion is baked, is brought into contact with the inner surface of the step portion 12b of the adapter 12 so as to form a stopper surface which prevents the sealing apparatus 30 from moving in an axial direction. The surface in which the rubber member close to the inside in the diametrical direction of the flange side surface in the side of the opposite cylinder portion is not baked forms a surface brought into contact with the opening end surface 8a of the outer 3.

The rubber member baked in the flange 33 constitutes the elastic member 31 having a seal portion which is brought into contact with the seal surface in an airtight manner. As shown in FIG. 9, the portion of the elastic member 31 which is baked in the peripheral edge surface of the flange 33 has an angular cross sectional shape, and has a peripheral edge portion 31a having an outer diameter greater than an inner diameter of the large cylinder portion 12c. The angular corner portion of the peripheral edge portion 31a is brought into contact with the inner periphery of the large cylinder portion 12c of the adapter 12 and is press inserted so as to elastically deform when the sealing apparatus 30 is attached to the adapter 12, whereby a force holding the sealing apparatus 30 can be obtained. Further, the corner portion mentioned above is brought into contact therewith, and the elastic member 31 pressed by the outer 3 inserted to the fitting operation completing position swells in a diametrical direction, whereby the peripheral edge portion 31a forms a first seal portion which is brought into contact with the inner peripheral surface of the large cylinder portion 12c corresponding to the seal surface in an airtight manner.

Further, the portion of the elastic member 31 which is baked on the flange side surface in the side of the cylinder portion is pressed to the inner surface of the annular step portion 12b of the opposing adapter 12 by the outer 3 inserted to the fitting operation completing position, and has a second seal portion which is brought into contact with the inner surface of the step portion 12b of the inner periphery of the adapter 12 corresponding to the seal surface in an airtight manner.

Further, the portion of the elastic member 31 which is baked on the flange side surface in the side opposite to the cylinder portion is pressed to the step portion end surface 8c of the outer 3 inserted to the fitting operation completing position, and has a third seal portion which is brought into contact with the step portion end surface 8c corresponding to the outer surface of the outer 3 forming the seal surface in an airtight manner.

As mentioned above, the annular elastic member 31 having the first, second and third seal portions is structured such that rigidity is applied thereto by the flange 33 in which the elastic member 31 is baked so as to keep the annular shape. Accordingly, the flange 33 constitutes a reinforcing member for the elastic member 31.

The elastic outer cylinder portion 35 is formed by the rubber member baked on the cylinder portion 34, and the elastic outer cylinder portion 35 is press inserted to the inner periphery of the small cylinder portion 12a of the adapter 12, whereby the flange 33 in which the elastic member 31 is baked, that is, the sealing apparatus 30 is securely held in the step portion 12b of the adapter 12, so that the cylinder portion 34 and the elastic outer cylinder portion 35 constitute a holding portion of the sealing apparatus 30.

Further, in the elastic outer cylinder portion 35, a plurality of protruding portions 35a which protrude outward in a diametrical direction and have a circular arc-shaped outer cross section are formed on the outer periphery of the portion opposing to the inner periphery of the small cylinder portion 12a of the adapter 12 so as to be arranged in a peripheral direction at a uniform interval and extend along an axial direction. These protruding portions 35a are formed so as to reduce the press insertion load. It is possible to easily adjust the press insertion load by adjusting the number of protruding portions 35a and a protruding height.

As mentioned above, sealing between the inner 2 and the boot main body, and sealing between the outer 3 and the adapter 12 by the boot 10, can prevent the lubricant such as grease charged within the outer 3 and within the boot 10 from leaking, and can prevent dust, water and the like from entering into the boot 10 and the outer 3.

A description will be given of a process of assembling the inner 2 and the outer 3 with reference to FIGS. 10 and 11.

The elastic outer cylinder portion 35 of the sealing apparatus 30 is press inserted into the inner periphery of the small cylinder portion 12a of the adapter 12 of the boot 10, whereby the sealing apparatus 30 is attached to the step portion 12b of the adapter 12. At this time, the sealing apparatus 30 is securely held to the adapter 12 by the press inserted elastic outer cylinder portion 35. The angular peripheral edge portion 31a of the elastic member 31 also assists to hold the sealing apparatus 30 due to the elastic force caused by the elastic deformation. Further, since the elastic member 31 is structured such that rigidity is applied thereto by the flange 33, the shape thereof is held and is not easily deformed, so that the elastic member 31 is securely attached to the normal position of the step portion 12b.

Then, the boot 10 to which the sealing apparatus 30 is attached is inserted to the shaft portion 4 of the inner 2 and the small cylinder end portion 11a of the boot main body 11 is fastened by the band 13, whereby the boot 10 is fixed to the shaft portion 4. Next, after the spider 5 is mounted to the shaft portion 4, lubricant such as grease or the like is charged within the boot 10 and within the outer 3. Then, the roller 6 is mounted to the support shaft of the spider 5 via the holder.

The inner 2 and the outer 3 prepared in this manner are set in the same manner as that of the first embodiment illustrated in FIG. 2 coaxially in a horizontal direction and in the same peripheral direction so that three rollers 6 of the inner 2 respectively oppose to three guide grooves of the outer 3.

Next, the inner 2 is inserted into the outer 3 and the fitting operation between the adapter 12 and the outer 3 is started together with the press insertion. The state during the fitting operation is illustrated in FIG. 10. In this state, in the same manner as the first embodiment, since the inside of the boot 10 is communicated with the open air via the communication groove 12f, the boot main body 11 is not expanded due to the pressure of the air within the boot 10, and the communication state between the inside of the boot 10 and the open air is maintained until the outer 3 is positioned at the position near the fitting operation completing position. When the outer 3 is positioned at the position near the fitting operation completing position, communication between the inside of the boot 10 and the communication groove 12f is shut due to the contact between the outer 3 and the elastic member 31, and the inside of the boot 10 is shut from the open air.

When the fitting operation is further performed, the contact surface of the flange 33 in the state that the stopper surface is brought into contact with the inner surface of the step portion 12b of the adapter 12 is brought into contact with the opening end surface 8a of the outer 3, the axial movement of the outer 3 against the adapter 12 is prevented, the fitting operation of the both elements is completed, and the outer 3 occupies the fitting operation completing position. At the time when the fitting operation is completed, as shown in FIG. 11, the first, second and third seal portions of the elastic member 31 are respectively brought into contact with the inner peripheral surface of the large cylinder portion 12c of the adapter 12 corresponding to the seal surface, the inner surface of the step portion 12b of the adapter 12 and the step portion end surface 8c of the outer 3, whereby sealing occurs between the adapter 12 and the outer 3 respectively. Then, a suitable compression force of the outer 3 and the adapter 12 against the elastic member 31 is set by suitably setting the axial direction interval formed between the inner surface of the step portion 12b of the adapter 12 and the step portion end surface 8c of the outer 3 due to the contact between the flange 33 and the outer 3, and further, the elastic member 31 is prevented from being excessively compressed.

Finally, the taper portion 12d of the adapter 12 which is in the state shown by a double dot chain line in FIG. 11 at the time when the fitting operation between the outer 3 and the adapter 12 is completed is caulked to the groove 8e in the manner illustrated by a solid line in FIG. 11, whereby the boot 10 is prevented from being taken out from the outer 3 and an assembly of the universal joint 1 is completed.

Since the second embodiment is structured in the manner mentioned above, in addition to effects (except the effect concerning the O-ring 20) which are the same as the effects obtained by the first embodiment, the following effects can be obtained.

The flange 33 to which the annular elastic member 31 is fixed, that is, the sealing apparatus 30, is securely held in the inner periphery of the adapter 12 by the elastic outer cylinder portion 35 disposed on the outer periphery of the cylinder portion 34 which is press inserted to the small cylinder portion 12a of the adapter 12 of the boot 10, so that the sealing apparatus 30 is not taken out. Further, since the elastic member 31 is structured such that rigidity is applied thereto by the flange 33, the shape thereof is held, so that the elastic member 31 is not easily deformed, is easily treated at the time of mounting, and is securely attached to the normal position of the step portion 12b in the normal attitude. Accordingly, efficiency of an assembling operation between the inner 2 and the outer 3 to which the boot 10 having the sealing apparatus 30 is attached is improved.

Since the cylinder portion 34 and the elastic outer cylinder portion 35 are positioned at the small cylinder portion 12a of the adapter 12, and the seal surface which is brought into contact with the seal portion of the elastic member 31 is positioned at the step portion 12b and the large cylinder portion 12c of the adapter 12, it is possible to separate the sealing apparatus 30 into a holding function portion constituted by a holding portion and a sealing function portion, constituted by the elastic member 31 and the flange 33 with respect to the step portion 12b corresponding to a boundary, so that a design which is optimum for the functions at each of the function portions is achieved.

Since the cylinder portion 34 constituting the holding portion constitutes a part of the metal fitting 32 which is integrally formed with the flange 33, the number of parts can be reduced, and rigidity of the sealing apparatus 30 becomes greater by the cylinder portion 34 and the flange 33, so that a deformation thereof is difficult to achieve. Further, since the press insertion is performed by utilizing the elastic force of the elastic outer cylinder portion 35, it is easy to press insert the adapter 12 of the holding portion to the inner periphery of the small cylinder portion 12a. Further, it is easier to attach the sealing apparatus 30 due to an increase of rigidity caused by the cylinder portion 34 and an easy press insertion generated by the elastic outer cylinder portion 35.

Since it is possible to reduce the press insertion load by means of the protruding portion 35a formed on the outer periphery of the elastic outer cylinder portion 35, it is easier to press insert the holding portion. Further, it is possible to easily adjust the press insertion load by adjusting the number, the height and the like of the protruding portion 35a.

It is possible to easily and securely shut the communication between the communication groove 12f and the inside of the boot 10 by means of the sealing apparatus 30 attached to the adapter 12 of the boot 10. Further, since the sealing apparatus 30 for sealing between the outer 3 and the boot 10 is utilized in order to shut the communication between the communication groove 12f and the inside of the boot 10, it is not necessary to independently provide and form the member for losing the communication groove 12f.

The flange 33 is brought into contact with the outer 3 and the step portion 12b of the adapter 12, whereby it is possible to set the suitable compression force applied to the elastic member 31 by the outer 3 and the adapter 12 by suitably setting the axial interval formed between the inner surface of the step portion 12b of the adapter 12 and the step portion end surface 8c of the outer 3. It is also possible to prevent the elastic member 31 from being excessively compressed.

In the first and second embodiments mentioned above, the communication grooves 12f are formed at six portions, however, the number of communication grooves 12f is not limited to six, and it is possible to increase or reduce the number as required. For example, if the air within the boot 10 is smoothly taken out at the time of fitting between the adapter 12 and the outer 3, only one communication groove 12f may be employed. The communication groove 12f may be an annular groove which is formed all over the periphery of the adapter 12. Further, in the case of forming a plurality of communication grooves 12f, it is not necessary to set the forming positions to be at a uniform interval in the peripheral direction, and it is possible to suitably arrange them as required.

In the first and second embodiments mentioned above, the communication passage is the communication groove 12f formed in the side of the adapter 12 in the fitting portion between the adapter 12 and the outer 3, however, the communication groove 12f may be formed in the side of the outer 3 of the fitting portion not in the side of the adapter 12.

In the first and second embodiments mentioned above, the universal joint 1 is employed for the propeller shaft, however, it is possible to employ it for a drive shaft of a vehicle.

In the second embodiment mentioned above, the seal surface between the elastic member 31 and the adapter 12 is the inner surface of the step portion 12b and the inner peripheral surface of the large cylinder portion 12c, however, it may be any one of them.

In the second embodiment mentioned above, the holding portion is constituted by the cylinder portion 34 and the elastic outer cylinder portion 35 having the protruding portion 35a, however, the protruding portion 35a may not be formed in the elastic outer cylinder portion 35. The elastic outer cylinder portion 35 and the elastic member 31 are integrally formed, however, both may be formed as separated elements. Further, it is possible to constitute the holding portion only by the cylinder portion 34 without providing the elastic outer cylinder portion 35. Then, in this case, if a plurality of slits extending in an axial direction are formed in the cylinder portion 34 at a uniform interval in a peripheral direction, it is possible to reduce the press insertion load.

As heretofore explained, embodiments of the present invention have been described in detail with reference to the drawings. However, the specific configurations of the present invention are not limited to the embodiments but those having a modification of the design within the range of the present invention are also included in the present invention.

In accordance with the invention according to a first embodiment of the present application, there is provided a universal joint comprising: an inner element and an outer elements which are assembled with each other; and a boot which has one end fitted to the inner element and the other end fitted to the outer so as to seal between the inner element and the outer element, wherein a communication passage which causes insides of the boot and the open air to communicate with each other until the outer element is positioned at a position near a fitting operation completing position from a fitting operation starting position, and which shuts communication with the insides of the boot and the open air when the outer element is positioned at the fitting operation completing position from the position near the fitting operation completing position which is formed in a fitting portion between the outer element and the boot.

In accordance with the invention according to the first embodiment, since the outer element and the boot start fitting with each other when assembling the inner and the outer element of the universal joint, and the air within the boot flows out to the open air through the communication passage during the fitting operation between the outer element and the boot until the outer element reaches the position near the fitting operation completing position from the fitting operation starting position, the pressure of the air within the boot can be kept at the same pressure as that of the open air. Accordingly, the pressure of the air within the boot is adjusted at the same time of assembling the inner element and the outer element, and it is unnecessary to adjust the pressure of the air within the boot after the fitting operation between the outer element and the boot is completed which, incidentally, is performed in the prior art, so that it is possible to improve efficiency of the operation of assembling the universal joint. Further, since it is unnecessary to adjust the air pressure by using a tool, no damage is done to the boot.

In accordance with the invention according to a second embodiment, there is provided a universal joint as recited in the first embodiment, wherein the boot is provided with a flexible boot main body which is fitted to the inner element, and is made of an elastic material, an adapter which is fitted to the outer element, and the communication passage is formed by a communication groove which is formed in the adapter. Accordingly, since the groove is formed in the existing adapter, it is easy to process and it is possible to easily form the communication passage.

In accordance with the invention according to a third embodiment, there is provided a universal joint as recited in the second embodiment, wherein a sealing apparatus which seals between the boot and the outer element, is attached to an inner periphery of the adapter, and communication between the inside air of the boot and the open air through the communication passage is shut in accordance with contact between the sealing apparatus and said outer element. Accordingly, it is possible to simply and securely shut communication between the communication groove and the inside of the boot by the sealing apparatus attached to the inner periphery of the adapter. Further, since the sealing apparatus for sealing between the outer and the boot is employed, it is unnecessary to independently provide or form a member for closing the communication groove.

In accordance with the invention according to a fourth embodiment, there is provided a universal joint according to the third embodiment, wherein the sealing apparatus is provided with an elastic member which is fixed to a reinforcing member, and is brought into contact with the inner surface of the adapter and the outer element with air tightness, and a holding portion which is press-inserted into the inner surface of the adapter, the communication between the inside air of the boot and the open air through the communication passage is shut in accordance with contact between the elastic member and the outer. Accordingly, the sealing apparatus is securely held on the inner surface of the adapter by the holding portion, and the sealing apparatus is not taken out. Further, since the elastic member sealing between the outer element and the boot is brought into contact with the outer element and the adapter in an airtight manner, rigidity is applied to the elastic member by the reinforcing member, so that the shape thereof is held and the elastic member is not easily deformed. Therefore, the elastic member can be easily treated at the time of mounting, and can be securely mounted to a normal position of the step portion in a normal attitude. Accordingly, efficiency of an operation of assembling the universal joint is also improved.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A universal joint comprising:

an inner element and an outer element which are assembled with each other; and a boot which has one end fitted to said inner element and the other end fitted to said outer element so as to seal between said inner element and said outer element, wherein a communication passage which causes insides of said boot and the open air to communicate with each other until said outer element is positioned at a position near a fitting operation completing position from a fitting operation starting position, and which shuts communication with the insides of said boot and the open air when said outer element is positioned at the fitting operation completing position from said position near the fitting operation completing position which is formed in a fitting portion between said outer element and said boot, said boot is provided with a flexible boot main body which is fitted to said inner element, and is made of an elastic material, an adapter which is fitted to said outer element, and said communication passage is formed by a communication groove which is formed in said adapter.

2. A universal joint comprising:

an inner element and an outer element which are assembled with each other; and a boot which has one end fitted to said inner element and the other end fitted to said outer element so as to seal between said inner element and said outer element, wherein a communication passage which causes insides of said boot and the open air to communicate with each other until said outer element is positioned at a position near a fitting operation completing position from a fitting operation starting position, and which shuts communication with the insides of said boot and the open air when said outer element is positioned at the fitting operation completing position from said position near the fitting operation completing position which is formed in a fitting portion between said outer element and said boot, said boot is provided with a flexible boot main body which is fitted to said inner element, and is made of an elastic material, an adapter which is fitted to said outer element, and said communication passage is formed by a communication groove which is formed in said adapter, a sealing apparatus which seals between said boot and said outer element, is attached to an inner periphery of said adapter, and communication between the inside air of said boot and the open air through said communication passage is shut in accordance with contact between said sealing apparatus and said outer element.

3. A universal joint comprising:

an inner element and an outer element which are assembled with each other; and a boot which has one end fitted to said inner element and the other end fitted to said outer element so as to seal between said inner element and said outer element, wherein a communication passage which causes insides of said boot and the open air to communicate with each other until said outer element is positioned at a position near a fitting operation completing position from a fitting operation starting position, and which shuts communication with the insides of said boot and the open air when said outer element is positioned at the fitting operation completing position from said position near the fitting operation completing position which is formed in a fitting portion between said outer element and said boot, said boot is provided with a flexible boot main body which is fitted to said inner element, and is made of an elastic material, an adapter which is fitted to said outer element, and said communication passage is formed by a communication groove which is formed in said adapter, a sealing apparatus which seals between said boot and said outer element, is attached to an inner periphery of said adapter, and communication between the inside air of said boot and the open air through said communication passage is shut in accordance with contact between said sealing apparatus and said outer element, said sealing apparatus is provided with an elastic member which is fixed to a reinforcing member, and is brought into contact with the inner surface of said adapter and said outer element with air tightness, and a holding portion which is press-inserted into the inner surface of said adapter, the communication between the inside air of said boot and the open air through said communication passage is shut in accordance with contact between said elastic member and said outer element.

* * * * *